(12) United States Patent
Campa Coloma et al.

(10) Patent No.: US 12,277,459 B2
(45) Date of Patent: Apr. 15, 2025

(54) GENERATING A PRINT DATA FOR AN IMAGE

(71) Applicant: Hewlett-Packard Development Company, L.P., Spring, TX (US)

(72) Inventors: Alex Campa Coloma, Sant Cugat del Valles (ES); Utpal Kumar Sarkar, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 203 days.

(21) Appl. No.: 18/307,531

(22) Filed: Apr. 26, 2023

(65) Prior Publication Data

US 2024/0362443 A1  Oct. 31, 2024

(51) Int. Cl.
*G06K 15/10* (2006.01)
*B41J 2/045* (2006.01)

(52) U.S. Cl.
CPC ........ *G06K 15/105* (2013.01); *B41J 2/04595* (2013.01)

(58) Field of Classification Search
None
See application file for complete search history.

(56) References Cited

U.S. PATENT DOCUMENTS

| | | | |
|---|---|---|---|
| 2014/0210911 A1* | 7/2014 | Mueller | H04N 1/52 347/54 |
| 2015/0002905 A1* | 1/2015 | Yoshida | H04N 1/58 358/3.06 |

* cited by examiner

*Primary Examiner* — Andrew H Lam
(74) *Attorney, Agent, or Firm* — Jordan IP Law, LLC

(57) ABSTRACT

Image data may indicate an average number of drops of printer fluid per pixel. Print data may be generated such that a total number of drops of printing fluid are deposited to a print medium during a pass in a forward direction and a pass in the reverse direction according to a distribution.

15 Claims, 11 Drawing Sheets

GENERATING A PRINT DATA FOR AN IMAGE

BACKGROUND

A printing device, such as, an ink-jet printer, may comprise multiple printheads to deposit a printing fluid onto a print medium to generate a printed image. A halftone image may define where drops of the print fluid are to be deposited onto the print medium in order to generate the printed image. The print medium may be advanced such that the printing fluid is deposited using a multi-pass print mode.

BRIEF DESCRIPTION OF THE DRAWINGS

Various examples will be described below by referencing the following drawings, in which.

DETAILED DESCRIPTION

Figure 1:
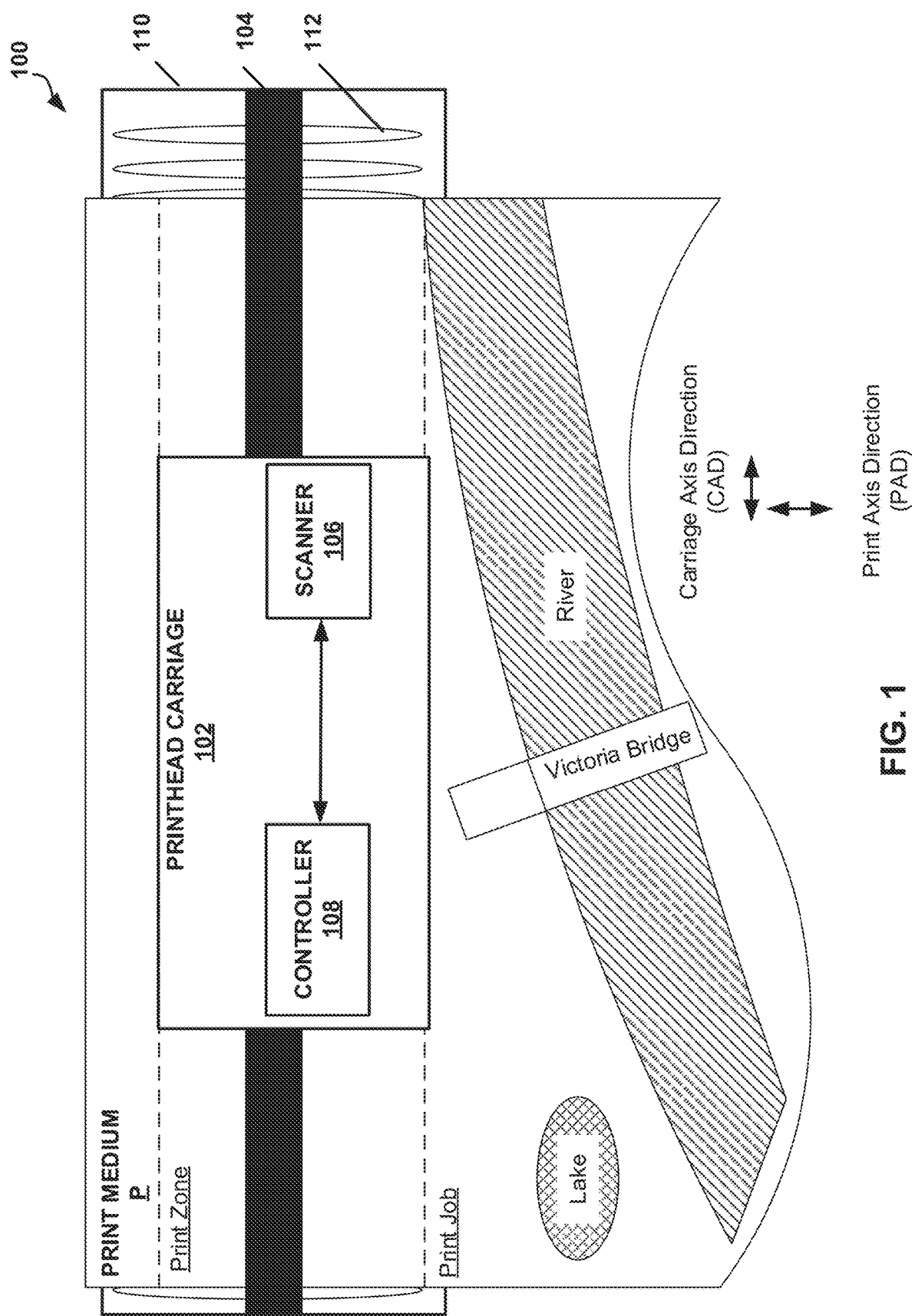
FIG. 1 is an illustration of an example printer device according to an example.

Certain examples described herein provide example techniques for generating print data. According to the techniques described herein, in one example, print data is generated such that printing fluid is deposited to a print medium during a pass in a forward direction and a pass in the reverse direction according to a particular distribution. The particular distribution may reduce artifacts in a print job.

A printer may utilize a halftoning process to reproduce a continuous tone image by approximating the continuous tone image to a discrete deposit pattern of printing fluid drops. An image printed using a halftoning process may appear continuous from a distance. However, when inspected at close range, the printed image is found to be constructed from discrete deposit patterns.

A printer may operate according to a multi-pass print mode. The length of the rows of nozzles of one or more printheads along a media advance direction (also referred to as a print axis direction) defines a print swath. In a multi-pass print mode, the print medium may advance a portion of the total length after each printing pass of the printheads. Thereby, each line (e.g., a line including lines of text, bands of a color) of the image to be printed is formed using successive passes of the printheads. Printing may be bidirectional in that ink may be deposited on a print area of a print medium when the carriage travels about a scan axis (also referred to as a carriage axis direction) in a forward pass (e.g., left-to-right) and also when travelling in a backward or reverse pass (e.g., right-to-left). The print medium may be advanced after each pass or after both passes have been completed.

Multi-pass print modes are commonly utilized by industrial printers, where an industrial printer may be a printer designed to print relatively large scale items (e.g., maps, signage, posters, etc.). Large scale print jobs may be printed to paper which is coated and relatively heavy, e.g., coated paper with a density in the order of approximately 130 g/m$^2$. Such paper may have characteristics such that it is malleable enough to be moved by a vacuum of a printer, but rigid enough to skip some of the vacuum slits. These characteristics may cause the pen-to-paper distance (i.e., distance between printheads and print medium) along the scan axis to be non-uniform (e.g., random or quasi-random). This can cause artifacts in a print job, as it may cause drops of printing fluid to fall in the wrong place on the print medium. In some cases, these artifacts are perceived as a change in color due to an increase in grain along a plot from top to bottom. That is, for example, vertical banding may appear. This disclosure describes techniques which may be used to mitigate such artifacts. It should be noted that the techniques described herein, may be generally applicable. For example, for various cases where there may be an unpredictable error in multi-pass printing modes (e.g., between forward and reverse passes).

FIG. 1 is an illustration of a printer device 100 according to an example. In the example illustrated in FIG. 1, printer device 100 comprises a printhead carriage 102, a scanner 106, and a controller 108. As further illustrated in FIG. 1, printhead carriage 102 is supported by member 104. Member 104 may include a rail or the like. In the example of FIG. 1, printhead carriage 102 is supported by member 104 and able to move across the width of a print medium P in a carriage axis direction (CAD). Print medium P advances underneath printhead carriage 104 in a print axis direction (PAD). Print medium may comprise a sheet or continuous web of media and may include any form of print media, including, but not limited to, paper, cardboard (i.e. corrugated media), fabric, polymer films, and the like.

In one example, printhead carriage 102 is slidably mounted on a guide rod. That is, member 104 may be a guide rod that defines a carriage transition (or carriage) axis along which printhead carriage 102 traverses over a print zone for performing printing. In one example, a carriage drive (not shown in FIG. 1) actuates printhead carriage 102 for effecting the carriage transition. Thereby, printhead carriage 102 is reciprocally translatable in a forward direction (e.g., left-to-right along CAD) and a backward or reverse direction (e.g., right-to-left along CAD) over a print zone. In one example, printhead carriage 102 and member 104 are enclosed by a hood (not shown in FIG. 1).

In the example illustrated in FIG. 1, print medium is supported in a print zone by a print medium support assembly 110. In the example illustrated in FIG. 1, print medium support assembly 110 includes vacuum slits 112. Vacuum slits 112 apply a vacuum to adhere a portion of the print medium to support print medium support assembly 110 while printing fluid is being deposited. It should be noted that for ease of illustration, print medium support assembly 110 represents a simplified print medium support assembly 110. For example, in some examples, a print medium support assembly may include numerous pallets traveling along an endless conveyor having various vacuum configurations. The techniques described herein are equally applicable to various print medium support assembly configurations.

As described in further detail below, for example, with respect to FIG. 2, printhead carriage 102 may include a plurality printheads, where a printhead comprises a die forming a plurality of nozzles. The nozzles may be aligned in one or more columns along a length of a printhead e.g., in a direction parallel to the PAD. For example, printhead carriage 102 may comprise a plurality of ink-jet printheads. A printing fluid, including, for example, ink or a modelling agent, may be ejected through the nozzles of the printhead. In this manner, printheads included in printhead carriage 102 may deposit ink onto print medium P thereby printing an image corresponding to a print job. It should be noted that in other examples, a printhead may include a thermal or piezo-electric printhead. Further, it should be noted that ink is used herein as an example, and in other examples, other printing fluids, such as, pre-printing and post-printing agents (e.g. varnishes, glosses, under-treatments) may alternatively be deposited.

As described in further detail below, in one example, a plurality of printheads may be arranged in two or more rows, which may be staggered. It should be noted that although printer device 100 is described as including a printhead carriage which traverses a print media in the CAD, in other examples, printhead carriage 102 may form part of a page wide array printer. In the example of a page wide array printer, a printhead carriage may be fixed about the CAD and printheads may extend across the width of a print medium. In this case, a position of a printed image on a print medium may be controlled through activation of different nozzles along the width of the page wide array. Further, in one example, printer device 100 may be configured such that printhead carriage 102 is able to traverse a print media in the CAD and the PAD. For example, in one example, printer device 100 may be configured such that member 104 is able to travel in the PAD. The techniques described herein may be equally applicable to a printhead carriage that traverses a print media about one or more directions or a printhead carriage that is fixed about one or more directions.

As further illustrated in FIG. 1, printer device 100 includes scanner 106 and controller 108. Scanner 106 may be configured to scan a printed image. Scanner 106 may include a reflectance sensor that is arranged to measure an intensity of reflected light (including, e.g., infrared light). For example, scanner 106 may include an emitter to emit light and sensor to measure an intensity of light that is reflected from a surface (e.g., the print medium). The measured intensity of reflected light may indicate whether ink is deposited to the corresponding location of a print media. For example, light reflected from black ink would have a lower measured intensity than light reflected from white paper. In this manner, it can be determined if black ink is deposited to a particular location of the white paper. Values measured by scanner 106 may be used for printer calibration operations. For example, controller 108 may receive values from scanner and perform printhead alignment calibration operations.

It should be noted that in FIG. 1, controller 108 is illustrated as being located on printhead carriage 102 in proximity to scanner 106. Such an illustration is for the sake of illustrative purposes. That is, controller 108 may be located at various locations within or in proximity to printer device 100 or may be physically independent of printer device 100. For example, controller 108 may comprise a computer system that is electronically coupled or otherwise in communication (e.g., wirelessly) with a printer device. In one example, controller 108 may comprise a printed circuit board and/or integrated circuitry. Further, in one example, controller 108 may form part of a control sub-system that is electronically-coupled to a wider control system, e.g., controller 108 may be coupled over a system bus to other printed circuit boards. In one example, controller 108 may comprise a processor in the form of a central processing unit, microprocessor or system-on-chip device. Controller 108 may include a memory and/or be electronically coupled to a memory (not shown in FIG. 1). A memory may comprise volatile and/or non-volatile memory. In some examples, the memory may comprise non-volatile memory to store instructions for the controller 108 and configuration data for the printing system. Further, instructions and/or data may be transferred from the non-volatile memory to the volatile memory during operation, wherein, for example, a processor of the controller 108 may access data and instructions stored in the volatile memory. The volatile memory may comprise any form of Random Access Memory (RAM) and the non-volatile memory may comprise solid-state memory, magnetic storage devices, and/or Read Only Memory (ROM), amongst others. Instructions stored in memory may be loaded and executed by a processor of controller 108 to affect the functionality described herein.

In addition to performing calibrations operations, controller 108 may receive print job commands and/or data corresponding to a print job (e.g., image data) from a print job source. A print job source may include a computer or any other source of print jobs. Controller 108 may generate print data such that a print job is executed. In some examples, controller 108 is configured to determine and/or reproduce a print mask from received data. In some examples, the received data itself may already correspond to a print mask. In other examples, a print mask may be dynamically generated during printing of a print job. Further, a print mask may also be stored from the outset in a memory and controller 108 may then dynamically access the print mask during execution of a print job. As described above, multi-pass print modes are commonly utilized by industrial printers. A print mask may correspond to a multi-pass print mode. Multi-pass print modes are described in greater detail below.

Figure 4:
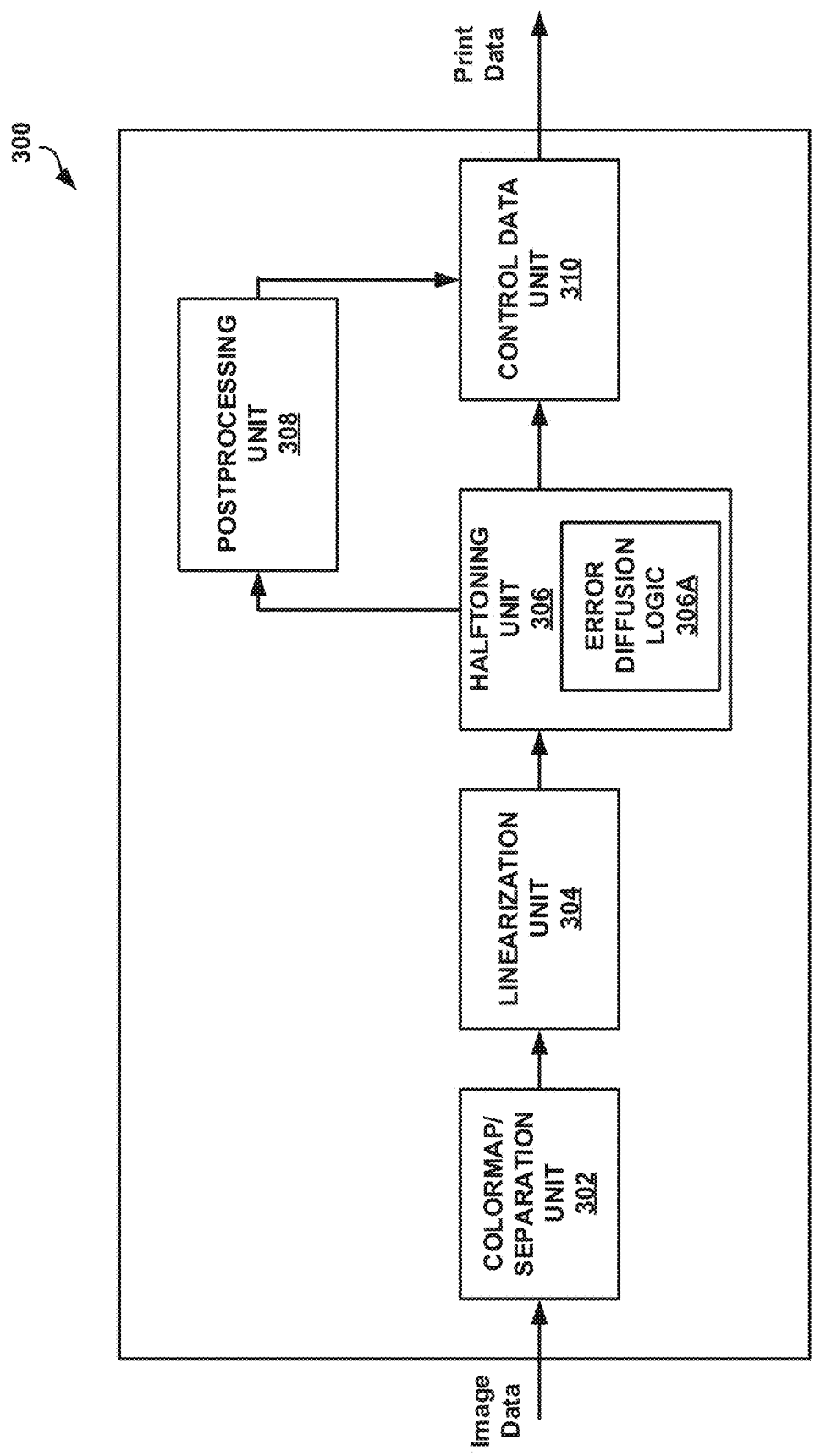
FIG. 4 is a block diagram of a printing pipeline of a printer controller that generates print data according to some examples.

As described above, printhead carriage 102 may include a plurality of printheads arranged in staggered rows. FIG. 2 is an illustration of an example printhead carriage 200 including printheads arranged in staggered rows according to an example. It should be noted that in some cases printheads may be referred to as pens. As described above, a printhead comprises a die forming a plurality of nozzles. A die, which may also be referred to as a printhead die, may include an integrated circuit structure formed on a silicon substrate. In some examples, dies may be embedded in monolithic moldings. A printhead architecture may define a number of dies per printhead, a number of columns of nozzles per die, and a number nozzles per column. For example, six dies may be located in a single printhead, each die may include four columns of nozzles, and each column of nozzles may include hundreds of nozzles. In some examples, a set of columns of nozzles is associated with a different color, such as cyan, magenta, yellow and black (CMYK). It should be noted that in some cases, a set of columns of nozzles may be referred to as a trench or slot. In the example illustrated in FIG. 2, for Printhead 4, nozzles columns for a trench are illustrated. It should be noted, as described in further detail below, a column of nozzles typically includes hundreds of nozzles, and the illustrated nozzle columns in FIG. 4 represent a simplification for explanatory purposes. For example, a printing device capable of printing at 1200 dots per inch (DPI) may have 1200 nozzles per inch (e.g., per inch length or per square inch) arranged or formed in its die or dies.

Figure 2:
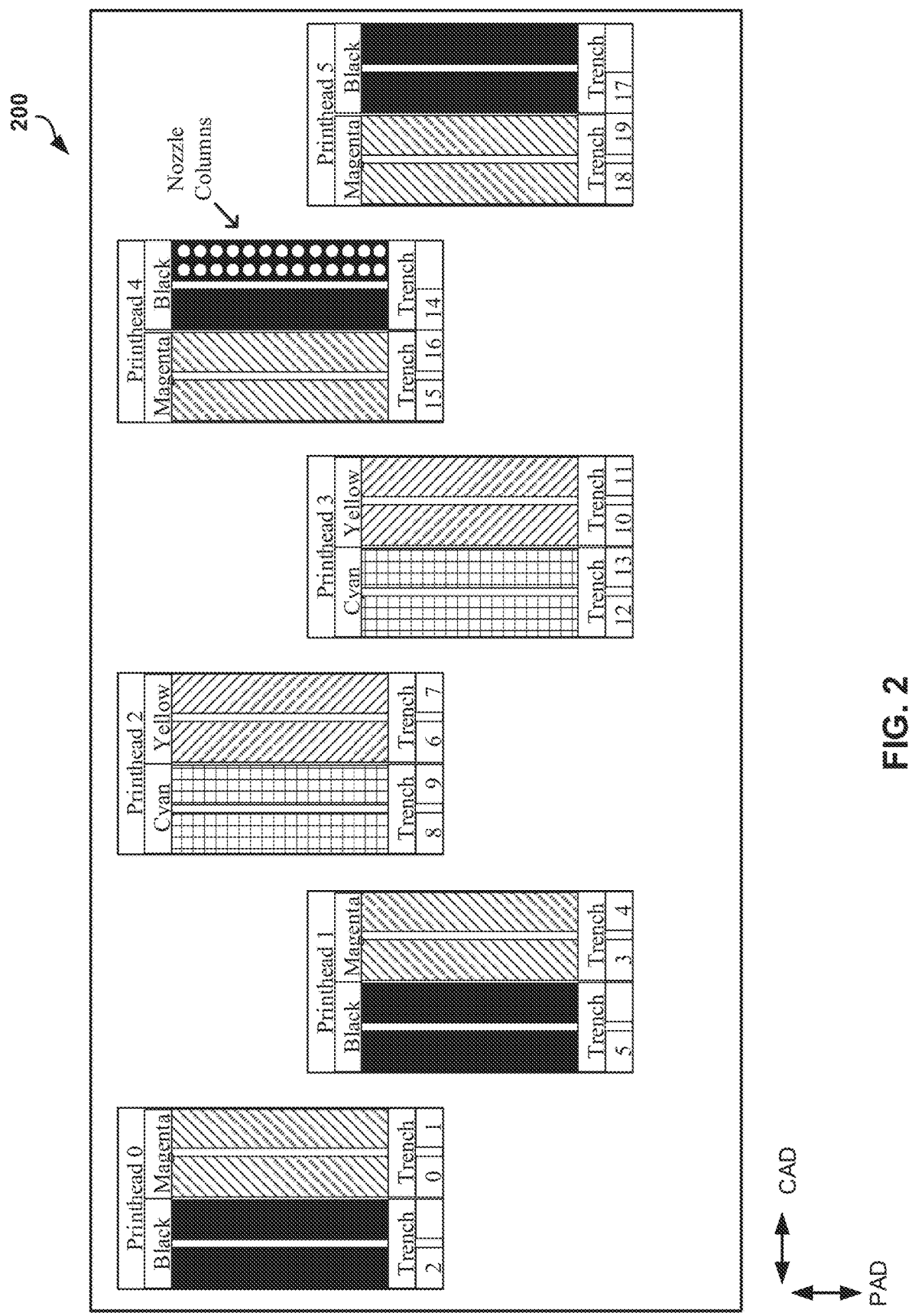
FIG. 2 is an illustration of an example printhead carriage according to an example.

In the example illustrated in FIG. 2, printhead carriage 200 includes six printheads (i.e., Printhead 0-Printhead 5) where each printhead includes three or four trenches and each trench is associated with a colorant. As illustrated in FIG. 2, Printhead 0, Printhead 2, and Printhead 4 are arranged in a row (hereinafter Row 0) about the CAD and Printhead 1, Printhead 3, and Printhead 5 are arranged in a row (hereinafter Row 1) about the CAD. As further illustrated in FIG. 2, there is overlap about the PAD between the bottoms of Printhead 0, Printhead 2, and Printhead 4 and the tops of Printhead 1, Printhead 3, and Printhead 5. In this manner, the printheads in printhead carriage 200 are arranged in staggered rows. It should be noted that although the example illustrated in FIG. 2 illustrates two staggered rows, in other examples printhead carriage 200 may include two or more rows of printheads, which may or may not be staggered. As such, the techniques described herein may be equally applicable to a printhead carriage including any number of rows of printheads.

As described above, a printhead includes a die having columns of nozzles and printheads in adjacent rows may overlap. Thus, columns of nozzles of printheads may overlap, i.e., form overlap regions. It should be noted that in some cases, overlap regions may also referred to as die stitching regions or overlap zones. It should be noted that in a typical alignment process, a so-called core alignment may be utilized to align printheads within the same row. That is, for example, referring to FIG. 2, during a core alignment, Printhead 2 may be aligned with Printhead 0 about the PAD and Printhead 4 may be aligned with Printhead 2 about the PAD. Similarly, Printhead 3 may be aligned with Printhead 1 about the PAD and Printhead 5 may be aligned with Printhead 3 about the PAD. Further, an additional alignment process may align the rows with each other.

As described above, multi-pass print modes are commonly utilized by industrial printers. In one example, printer device 100 may operate in a multi-pass print mode (also referred to as shingling). In multi-pass print mode, for printers with scanning printheads, a print medium may only advance a fraction of the total length of a nozzle array after each printing pass of the printhead. In a multi-pass print mode, each strip of the image to be printed may be formed in successive passes of the printheads. A print mode may have a number of parameters such as the number of passes required to fill an area, and the position of the ink droplets at every pass. To define such features, a print mask may be created that defines each position of each pass in which a drop is deposited. In some cases, a print mask may refer to logic that includes control data determining which nozzles of the different printheads are fired at a given time to eject fluid in order to reproduce a specific print job. It should be noted that a print mask for an inkjet printer in multi-pass print mode is also referred to as shingling mask.

Figure 3:
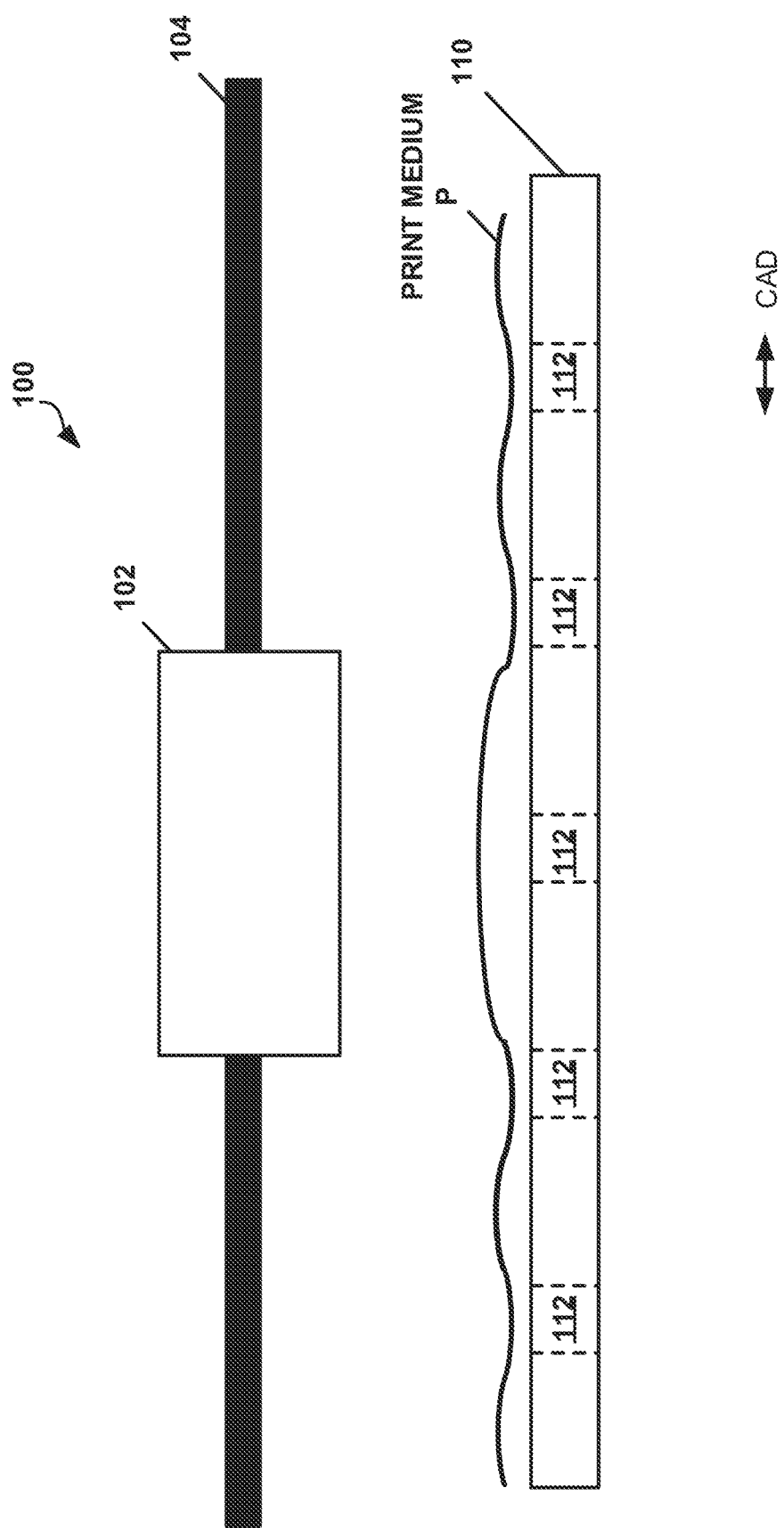
FIG. 3 is an illustration of an example printer device according to an example.

As described above, large scale print jobs may be printed to paper which is coated and relatively heavy, e.g., coated paper with a density in the order of approximately 130 g/m$^2$. In one example, printer device 100 may be configured to print to paper which is coated and relatively heavy, for example, using a multi-pass print mode. For example, printer device 100 may print using a 12 pass print mode. As described above, coated and relatively heavy paper may have characteristics such that it is rigid enough to skip some of the vacuum slits. FIG. 3 illustrates an example where print medium P has characteristics such that it skips a vacuum slit 112 and is not fully compressed between vacuum slits 112. As described above and illustrated in FIG. 3, this creates non-uniform distances between print medium P and printhead carriage 102, which can create artifacts. In one example, according to the techniques herein, controller 108 may be configured to generate print data, (e.g., print masks) in a manner that mitigates the appearance of artifacts.

FIG. 4 is a block diagram of a printing pipeline of a printer controller that generates print data according to some examples. As illustrated in FIG. 4, the printing pipeline of controller 300 includes colormap/separation unit 302, linearization unit 304, halftoning unit 306, and control data unit 310. As further illustrated in FIG. 4, the pipeline includes postprocessing unit 308. It should be noted that although example controller 300 is illustrated as having distinct functional blocks, such an illustration is for descriptive purposes and does not limit controller 300 and/or subcomponents thereof to a particular hardware or software architecture. Functions of controller 300 may be realized using any combination of hardware, firmware, and/or software implementations. That is, a unit can refer to a hardware processing circuit, which can include any or some combination of a microprocessor, a core of a multi-core microprocessor, a microcontroller, a programmable integrated circuit, a programmable gate array, or another hardware processing circuit. Alternatively, a unit can refer to a combination of a hardware processing circuit and machine-readable instructions (software and/or firmware) executable on the hardware processing circuit. A unit can include a portion of a hardware processing circuit of controller 300, or alternatively, a unit can include machine-readable instructions executable by the controller 300.

As illustrated in FIG. 4, the printing pipeline receives image data and generates print data. Print data may be used to control printing of an image on a print medium. In the example of FIG. 4, colormap/separation unit 302 receives input image data. The image data may include color data represented in an image color space, such as image-level pixel representations in a red-green-blue (RGB) color space, a cyan-magenta-yellow-black (CMYK) color space, and so forth. In some cases, such image data may be referred to as continuous tone or contone data. That is, such data may be capable of representing numerous tones of a color per pixel. For example, for an RGB image, each channel may have an intensity value ranging from 0 to 255 corresponding to levels of intensity that may be reproduced. The colormap/separation unit 302 may map the color data from the input image color space to an intermediate color space. For example, colormap/separation unit 302 may map RGB color space data to CMYK color space data, where the CMYK color space corresponds to colorants of a printer device. Linearization unit 304 may map non-linear intermediate color space data to a linear function. For example, a linear function corresponding to a printing device.

As described above, a halftoning process reproduces a continuous tone image by approximating the continuous tone image to a discrete deposit pattern of printing fluid drops. Examples of halftoning process include search-based half-toning, matrix half-toning, and error diffusion. Halftoning unit 306 may be configured to perform one or more halftoning processes. In the example, illustrated in FIG. 4, halftoning unit 306 is illustrated as including error diffusion logic 306A. Error diffusion logic 306A may be utilized by halftoning unit 306 to perform error diffusion. In error diffusion, essentially, the error caused by a particular pixel is calculated and propagated to neighboring pixels or locations in specific proportions (e.g., weights). For example, in some regions of an image, the error may be diffused evenly among unprocessed neighbor locations while, in other regions, the error may be diffused randomly. In some examples, the decision regarding whether or not print fluid is to be deposited at a particular position may be made in a position-dependent manner.

Figure 5:
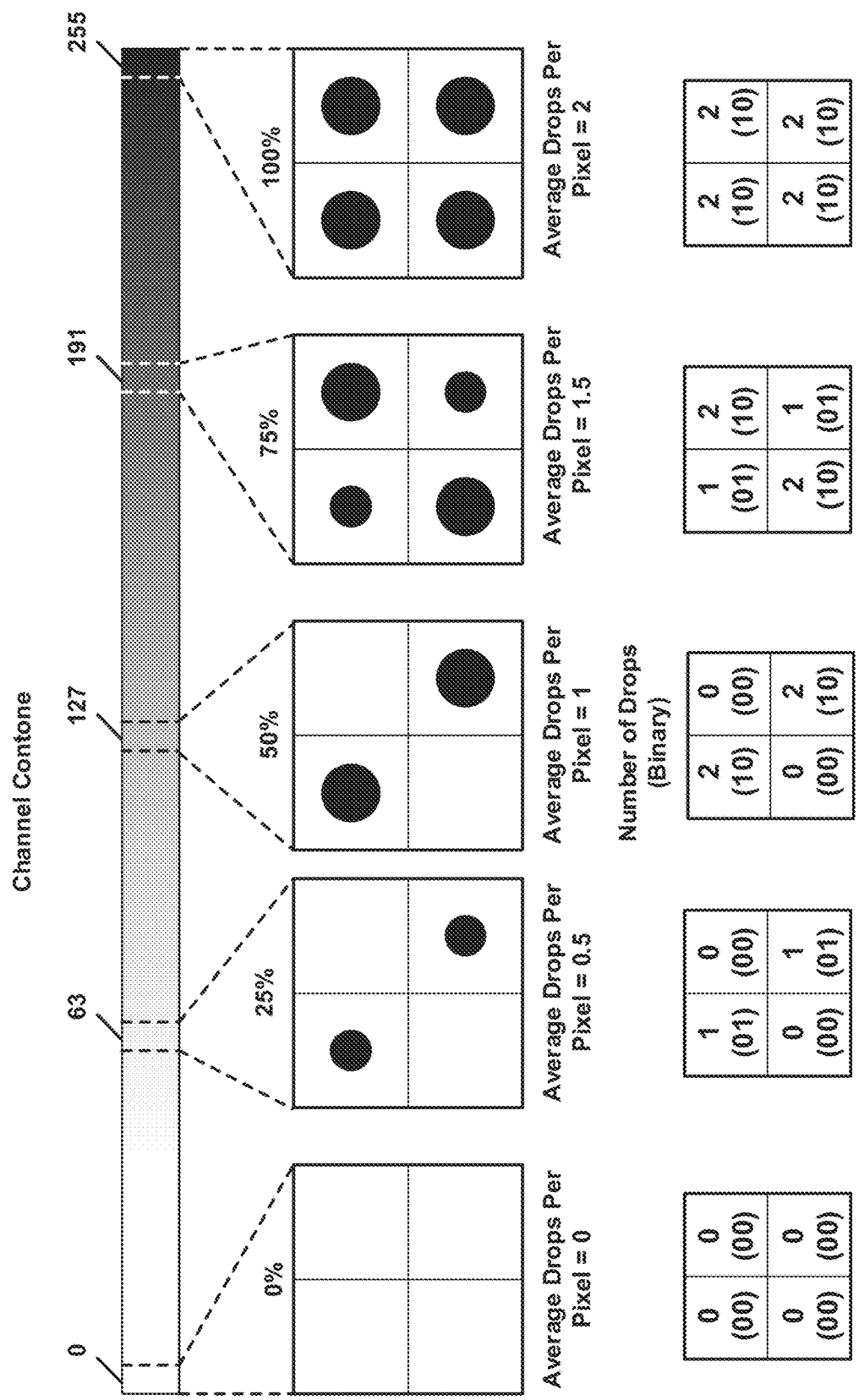
FIG. 5 is an illustration of halftone image data according to an example.

Regardless of the particular halftoning process, halftoning essentially represents image data using a discrete pattern of deposited printing fluid dots. FIG. 5 is an illustration of halftone image data according to an example. Referring to FIG. 5, at the top, a gradient representing continuous tone color data is illustrated. As described above, each channel in an image may have an intensity value ranging from 0 to 255. As illustrated, the gradient ranges from 0% intensity (e.g., 0/225) to 100% intensity (255/255). That is, in the case of a black channel, 0% represents white and 100% represents pure black with percentages in between representing various grayscales. Illustrated below the gradient are various coverage patterns which provide a conceptual visualization of halftoning. That is, in the example, each cell of 2×2 pixels includes a coverage pattern corresponding to an intensity. That is, in FIG. 5, a pixel is the smallest addressable unit on which a drop of printing fluid may be deposited, for example according to a DPI capability of a particular printing device. For example, for a 600 DPI×600 DPI printer, a square inch would include 600×600 pixels and for a 1200 DPI×1200 DPI printer, a square inch would include 1200×1200 pixels. It should be noted that pixels in FIG. 5 are distinct from pixels of image data. As illustrated in FIG. 5, for 0% intensity (i.e., white) no printing fluid is deposited to the cell, and for 100% intensity, the maximum amount of printing fluid is deposited to the cell. In the example illustrated in FIG. 5, each pixel may have 0, 1, or 2 drops deposited thereto, where 1 drop is represented by the smaller circles and 2 drops are represented by the larger circles. In FIG. 5, a number of drops deposited per pixel, (i.e., number of drops) are illustrated using a numeric value and a 2-bit binary representation (i.e., 2 bits per pixel (bpp)). In the example of FIG. 5, 00 indicates 0 drops, 01 indicates 1 drop, and 10 indicated 2 drops.

Figure 6:
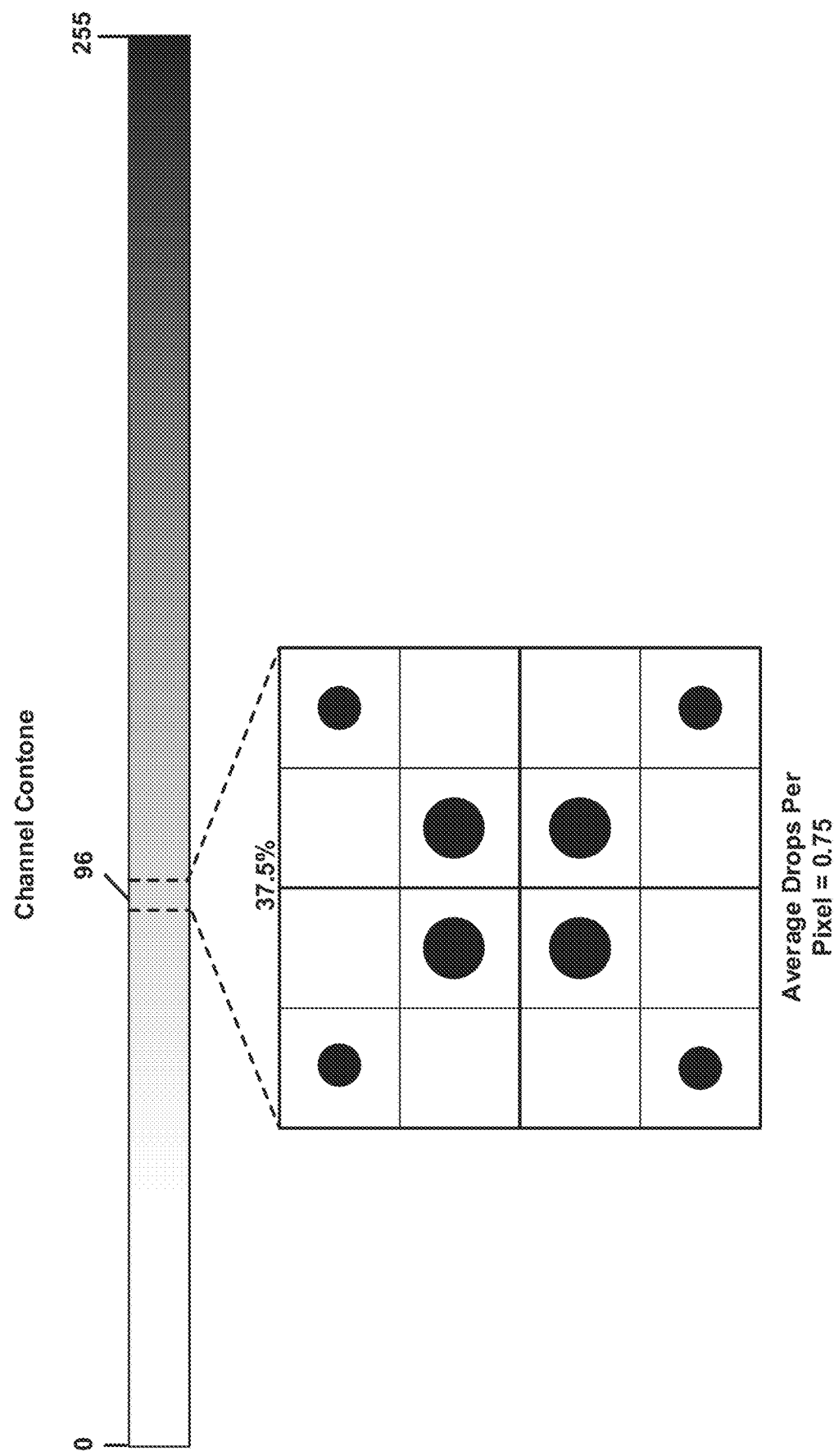
FIG. 6 is an illustration of generating halftone image data according to an example.

As described above, a halftoning process reproduces a continuous tone image by approximating the continuous tone image to a discrete deposit pattern of printing fluid drops In one example, a halftoning process may determine an average number of drops to be deposited per pixel. For example, in the example where each pixel may have 0, 1, or 2 drops deposited thereto and an intensity value ranges from 0 to 255, a contone value of 0 would correspond to 0% coverage and thus an average of 0 drops per pixel. Similarly, a contone value of 255 would correspond to 100% coverage and thus, an average of 2 drops per pixel. For each intermediate intensity value, an average number of drops may be determined based on an intensity percentage. For example, as illustrated in FIG. 6, an intensity value of 96 would correspond to 37.5% (i.e., 96/255) and thus, have an average number of drops per pixel of 0.75 (i.e., 0.375*2). A particular halftoning process may determine how a spatial mixture of a particular average number of drops per pixel is achieved.

Referring again to FIG. 4, control data unit 310 may be configured to receive data from a halftoning process and generate print data, e.g., print masks. As described above, a print mask may be created that defines each position of each pass in which a drop is deposited. In some examples, a print data may cause printing fluid to be deposited according to an additive process. For example, referring to FIG. 5, for pixels having 2 drops (i.e., binary 10), an additive process may cause both drops to be deposited from a printhead to the pixel. It should be noted that in a typical additive process, the 2 drops may be fired during the same pass or passes in the same direction. As described above, a distance between printheads and print medium may be non-uniform. In this case, the appearance of artifacts may be exacerbated when a typically additive process is utilized. In one example, according to the techniques herein, colormap/separation unit 302, linearization unit 304, halftoning unit 306, control data unit 310 and/or postprocessing unit 308 may be configured to generate print data such that printing fluid is deposited according to a particular distribution. In one example, the particular distribution may correspond to a distribution that causes printing fluid to be deposited approximately equally (50/50) during forward passes and reverse passes. For example, in the case of a 12 pass multi-pass print mode, half of the printing fluid may be deposited during the 6 forward passes (which may be referred to as even passes) and half of the printing fluid may be deposited during the 6 reverse passes (which may be referred to as odd passes). It should be noted that in other examples, other distributions may be utilized, e.g., 80/20, 75/25, 60/40, etc. For example, a distribution may correspond to a maximal density that limits damage to a printhead or a maximal density that degrades image quality and/or setting a preference to print as much as possible in one direction (e.g., 80/20). In another example, a distribution could print all content up to a particular density (e.g. 50%) in one direction, and distribute the high-density content in both directions.

Figure 7:
FIG. 7 is an illustration of generating print data according to an example.

FIG. 7 is an illustration of generating print data according to an example. In the example illustrated in FIG. 7, image data corresponding to the example illustrated in FIG. 6 is included as input. That is, according to the techniques herein, a contone value, an average number of drops per pixel value, or halftone data may be received as input. Further, it should be noted that the example illustrated in FIG. 7 is illustrated with respect to the K colorant of a CMYK color space. It should be noted that the techniques described herein are equally applicable to various printing fluids, e.g., C, M, and Y colorants. Referring to FIG. 7, as described above with respect to FIG. 6, the input image data indicates an average number of 0.75 drops per pixel. In the example in FIG. 7, according to the techniques herein, the average number of drops per pixel is distributed to two planes. That is, 0.75 average drops per pixel are divided into two 1 bpp planes (K and virtual k), where 1 bpp indicates 0 or 1 drop. The K channel 1 bpp plane and the virtual k channel 1 bpp plane may be described as being independent. As described above, in some cases, it may be beneficial to cause printing fluid to be deposited according to a particular distribution. In the example illustrated in FIG. 7, the average number of drops indicated by the input image data are distributed approximately equally across each of a K channel 1 bpp plane and a virtual k channel 1 bpp plane, i.e., each include an average number of drops of 0.375. It should be noted that, in one example, the K channel 1 bpp plane and the virtual k channel 1 bpp plane may be generated independently, such that overlap is essentially random. It should be noted that when overlaps are minimized, printing fluid coverage will be maximized, but if there is a misalignment (e.g., where there is a wave in the paper) this will change, and the resulting regions will look different. When K and virtual k are decorrelated, the coverage will be essentially independent of any misalignment. Finally, it should be noted that in FIG. 7, the 2 bpp representation is provided for each of the two 1 bpp channels. Such a representation may be utilized from subsequent data processing.

Referring to again to FIG. 7, each of the K channel 1 bpp plane and the virtual k channel 1 bpp plane are combined. In one example, operations illustrated in FIG. 7 may be performed by postprocessing unit 308. That is, postprocessing unit 308 may be configured to perform logical/LUT-based pointwise operations to combine the 1 bpp data. In the example illustrated in FIG. 7, the virtual k channel 1 bpp halftone is checked pixel-by-pixel to determine if a drop is indicated. In FIG. 7, this is illustrated as the 1's in the $2^{nd}$ bit of the 2-bit representation being underlined. In the case where a drop is found, this information is combined with the K channel 1 bpp plane. That is, as illustrated in FIG. 7, the $1^{st}$ bit in a corresponding pixel of the K channel is set equal to 1. Thus, as illustrated in FIG. 7, each pixel in the illustrated output may have a value of 00, 01, 10, or 11. This data may be used as or used to generate print data (e.g., print masks) where 00 corresponds to 0 drops, 01 corresponds to 1 drop during a forward pass, 10 corresponds to 1 drop during a reverse pass, and 11 corresponds to 1 drop during a forward pass and 1 drop during a reverse pass. In this manner, even and odd passes can be encoded and controlled independently. It should be noted that comparing the halftone at the top of FIG. 7 to the output, the average drops per pixel is maintained, but in the output, the depositing of the printing fluid is equally distributed between even and odd passes, which is in contrast to typical additive processes.

Figure 9:
FIG. 9 is an illustration of a halftone image generated using a multi-pass mode according to an example.
Figure 9:
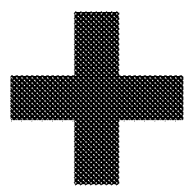
Figure 9:
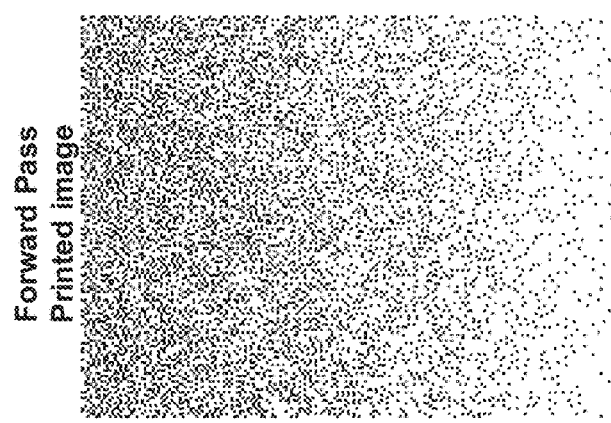
Figure 9:
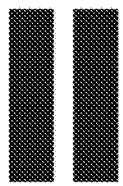
Figure 9:
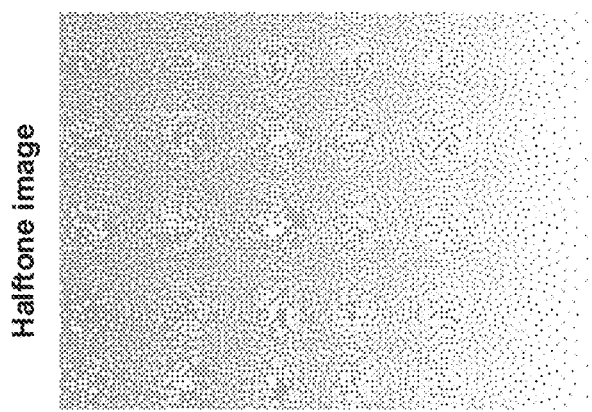
Figure 10:
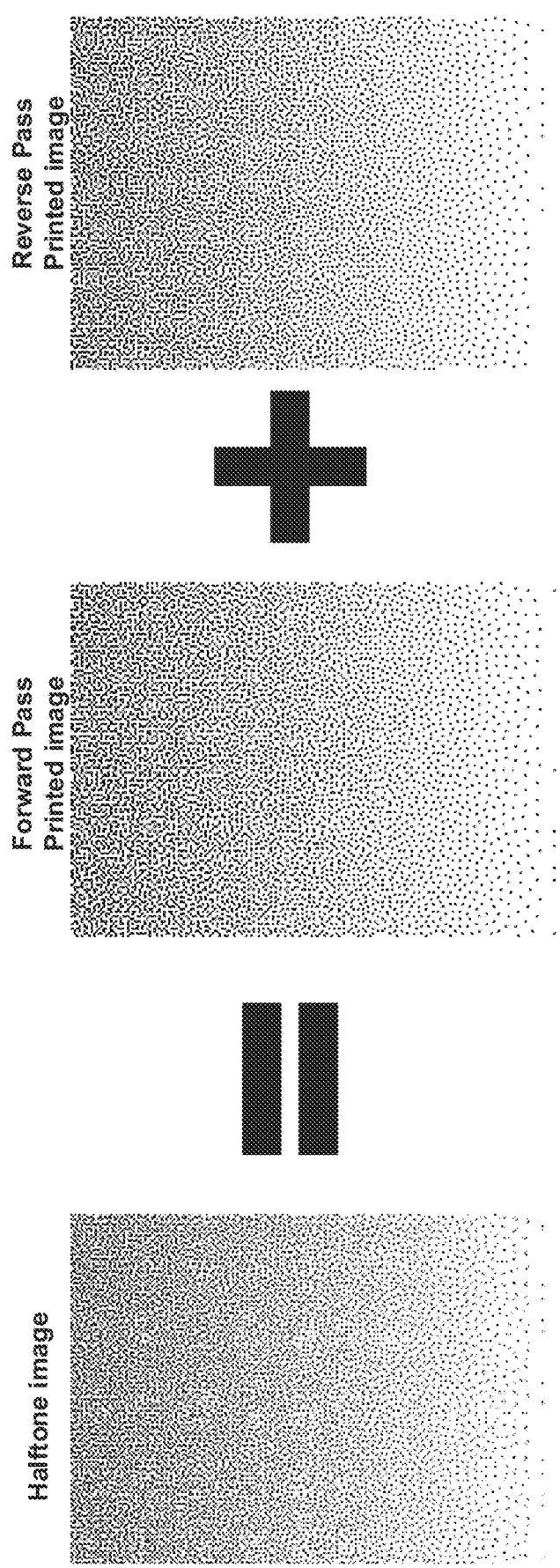
FIG. 10 is an illustration of a halftone image generated using a multi-pass mode according to an example.

As described above, a distance between printheads and print medium may be non-uniform and the appearance of artifacts may be exacerbated when an additive process is utilized. Deposited printing fluid according to a particular distribution may mitigate the appearance of artifacts. FIG. 9 illustrates an example of a halftone image generated according to an additive process and FIG. 10 illustrates an example of a halftone image generated according to a process where printing fluid is distributed approximately equal between forward and reverse passes. Comparing the halftone image in FIG. 9 to the halftone image in FIG. 10, in FIG. 10, the pattern in each individual direction appears more consistent. That is, in FIG. 10 each of the forward and reverse passes have independent noise patterns (e.g., blue noise patterns) which may reduce the appearance of artifacts.

It should be noted that although the example described above describes a channel with a 0, 1, 2 drops per pixel being distributed to two planes, the techniques described herein are generally applicable to various input channels being distributed into various numbers of planes. For example, a 2 bpp input channel may be coded to indicate 0, 1, 2, or 3 drops; 0, 1, 2, or 4 drops; 0, 1, 3, or 5 drops; etc. According to the techniques herein, the average number of drops per pixel may be distributed to various numbers for planes, e.g., 2, 3, 4, etc. For example, the number of planes could correspond to a multiple of a total number of passes for a multi-pass mode.

Figure 8:
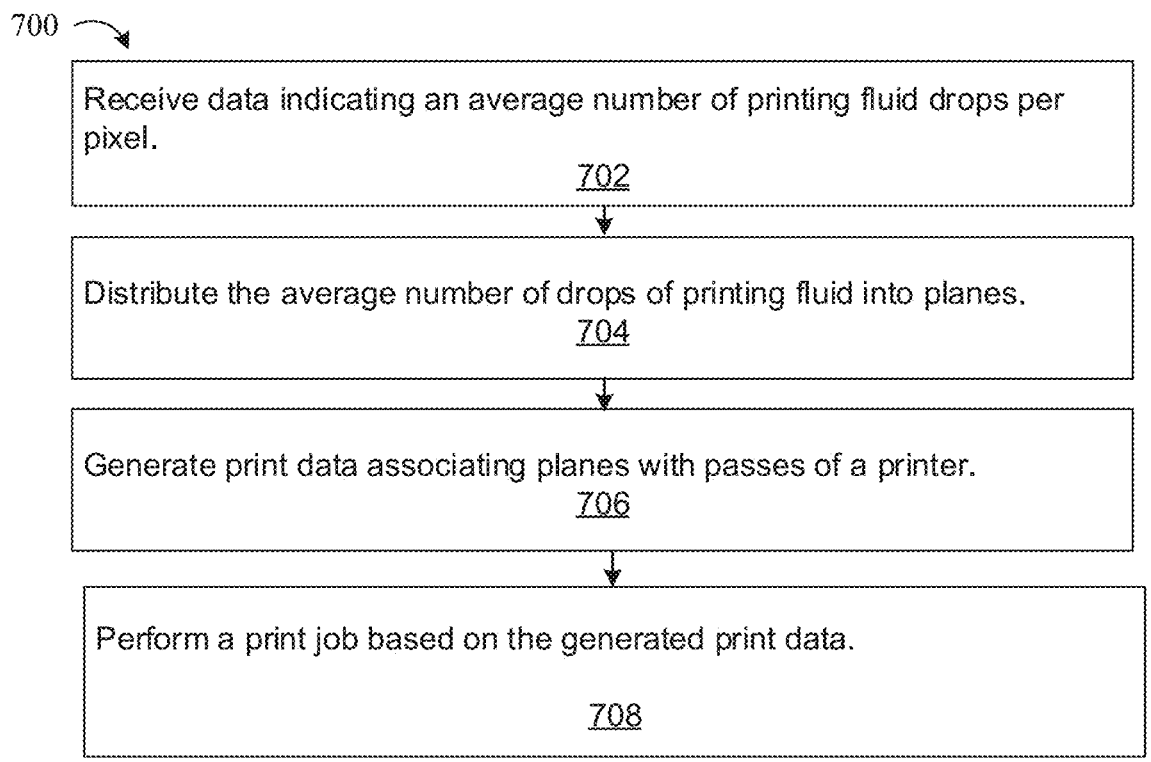
FIG. 8 is an illustration of a flowchart of generating print data according to an example.

FIG. 8 is an illustration of a flowchart of an example method for generating print data according to an example. The method 700 may generally be implemented in a printer device, such as, for example, the printer device 100 (FIG. 1). In an example, the method 700 may be implemented in computer readable instructions (e.g., software), configurable computer readable instructions (e.g., firmware), fixed-functionality computer readable instructions (e.g., hardware), etc., or any combination thereof.

Illustrated processing block 702 provides for receiving data indicating an average number of printing fluid drops per pixel. For example, a controller of printer device may receive and/or generate data indicating an average number of printing fluid drops per pixel. Data indicating an average number of printing fluid drops per pixel may correspond to contone data or halftone data. For example, as described above with respect to FIG. 7.

Illustrated processing block 704 provides for distributing the average number of drops of printing fluid per pixel into planes. That is, the average number of drops of printing fluid per pixel may be distributed to, for example, two planes according to an approximately equal distribution. For example, as described above with respect to FIG. 7.

Illustrated processing block 706 provides for generating print data associating planes with passes of a printer. For example, print masks may be generated where a first plane is associated with even passes and a second plane is associated with odd passes. For example, as described above with respect to FIG. 7.

Illustrated processing block 708 provides for performing a print job based on the generated print data. For example, a print mask may cause printing fluid to be deposited according to a particular distribution. For example, as described above with respect to FIG. 7.

Figure 11:
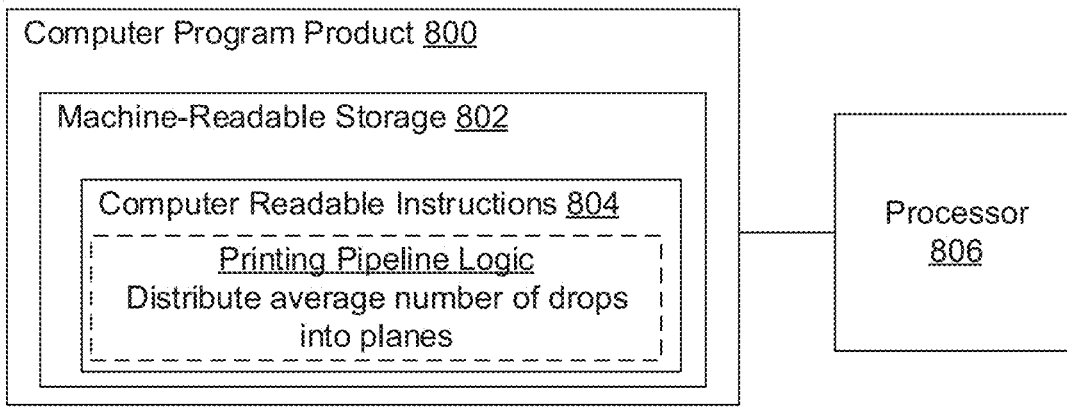
FIG. 11 is a block diagram illustrating a computer program product according to an example.

FIG. 11 illustrates a block diagram of an example computer program product 800. In some examples, as shown in FIG. 11, computer program product 800 includes a machine-readable storage 802 that may also include computer readable instructions 804. In some implementations, the machine-readable storage 802 may be implemented as a non-transitory machine-readable storage. In some implementations, the computer readable instructions 804, which may be implemented as software, for example. In an example, the computer readable instructions 804, when executed by a processor 806, implement one or more aspects of the method 700 (FIG. 8). That is, printing pipeline logic illustrated in FIG. 11 may include one or more aspects of the method 700 (FIG. 8).

Figure 12:
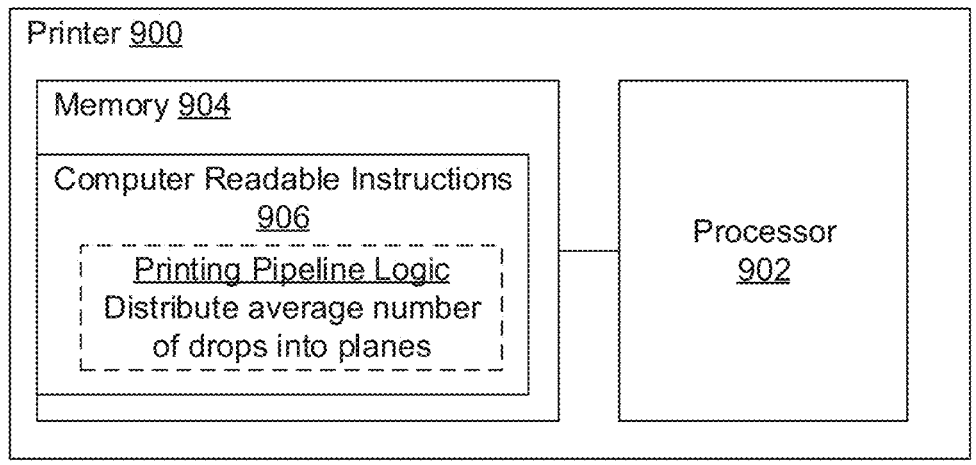
FIG. 12 is a block diagram illustrating an example fluid delivery apparatus according to an example.

FIG. 12 is a block diagram illustrating a hardware apparatus including a semiconductor package according to an example. FIG. 12 shows an illustrative example of a printer 900. In the illustrated example, the printer 900 may include a processor 902 and a memory 904 communicatively coupled to the processor 902. The memory 904 may include computer readable instructions 906, which may be implemented as software, for example. In an example, the computer readable instructions 906, when executed by the processor 902, implement one or more aspects of the method 700 (FIG. 8), described above. That is, printing pipeline logic illustrated in FIG. 12 may include one or more aspects of the method 700 (FIG. 8).

In some implementations, the processor 902 may include a general purpose controller, a special purpose controller, a storage controller, a storage manager, a memory controller, a micro-controller, a general purpose processor, a special purpose processor, a central processor unit (CPU), the like, and/or combinations thereof. Further, implementations may include distributed processing, component/object distributed processing, parallel processing, the like, and/or combinations thereof. For example, virtual computer system processing may implement one or more of the methods or functionalities as described herein, and the processor 902 described herein may be used to support such virtual processing.

In some examples, memory 904 is an example of a computer-readable storage medium. For example, memory 904 may be any memory which is accessible to the processor 902, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 13:
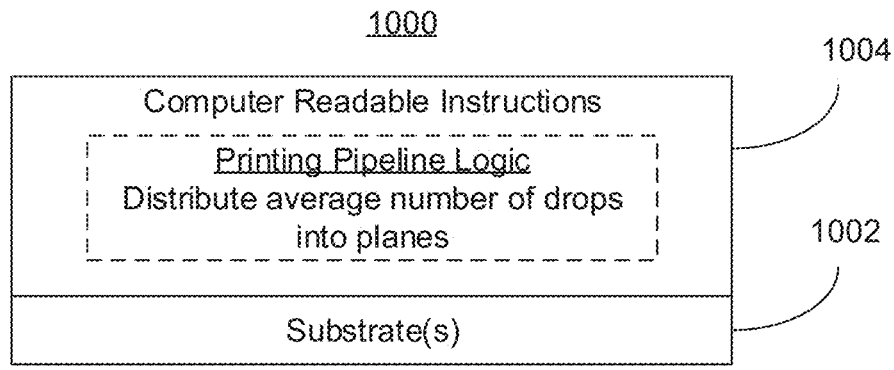
FIG. 13 is a block diagram illustrating a hardware apparatus including a semiconductor package according to an example.

FIG. 13 shows an illustrative semiconductor apparatus 1000 (e.g., chip and/or package). The illustrated apparatus 1000 includes one or more substrates 1002 (e.g., silicon, sapphire, or gallium arsenide) and computer readable instructions 1004 (such as, configurable computer readable instructions (e.g., firmware) and/or fixed-functionality computer readable instructions (e.g., hardware)) coupled to the substrate(s) 1002. In an example, the computer readable instructions 1004 implement one or more aspects of the method 700 (FIG. 8), described above. That is, printing pipeline logic illustrated in FIG. 13 may include one or more aspects of the method 700 (FIG. 8).

In some implementations, computer readable instructions 1004 may include transistor array and/or other integrated circuit/IC components. For example, configurable firmware logic and/or fixed-functionality hardware logic implementations of the computer readable instructions 1004 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples may be combined to form additional examples.

We claim:

1. A method of generating print data, comprising:
  receiving image data indicating an average number of drops of printing fluid per pixel;
  distributing the average number of drops into a first plane and a second plane; and
  generating print data from the first plane and the second plane, such that drops of printing fluid in the first plane are deposited to a print medium during a pass in a first direction and drops of printing fluid of the second plane are deposited to the print medium during a pass in an opposite second direction.

2. The method of claim 1, wherein the image data corresponds to a K channel of a CMYK color space.

3. The method of claim 1, wherein the image data corresponds to an intensity value.

4. The method of claim 1, wherein the average number of drops is based one of: 0, 1, or 2 drops of printing fluid being deposited per pixel.

5. The method of claim 4, wherein the first plane and the second plane include data indicating one of: 0 or 1 drop of printing fluid deposited per pixel.

6. The method of claim 1, wherein distributing the average number of drops of printing fluid into a first plane and a second plane includes distributing the average number of drops approximately equally to the first plane and the second plane.

7. The method of claim 1, wherein generating print data includes generating a 2-bit value per pixel, wherein a first bit indicates that a drop of printing fluid is deposited to the print medium during a pass in the first direction and a second bit indicates that a drop of printing fluid is deposited to the print medium during a pass in the second direction.

8. A printer device, comprising:
  a printhead carriage housing multiple printheads, wherein the printhead carriage is movable in a forward direction and a reverse direction, such that printing fluid in the multiple printheads may be deposited to a print medium during a pass in the forward direction or a pass in the reverse direction;
  a controller to:
    receive image data indicating an average number of drops of printer fluid per pixel; and
    generate print data such that a total number of drops of printing fluid are deposited to the print medium during a pass in a forward direction and a pass in the reverse direction according to a distribution.

9. The printer device of claim 8, wherein the distribution is approximately equal.

10. The printer device of claim 8, wherein the average number of drops is based one of: 0, 1, or 2 drops of printing fluid being deposited per pixel.

11. The printer device of claim 9, wherein the generated print data indicates whether 0 or 1 drop of printing fluid are deposited to the print medium during a pass in the forward direction and whether 0 or 1 drop of printing fluid are deposited to the print medium during a pass in the reverse direction.

12. The printer device of claim 11, wherein the print data includes data for multiple passes in the forward and reverse direction.

13. A non-transitory computer-readable storage medium comprising a set of computer-readable instructions stored thereon, which when executed by a processor of a printing system, cause the processor to:
  receive image data indicating an average number of drops of printing fluid per pixel;
  distribute the average number of drops of printing fluid into a first plane and a second plane; and
  generate print data from the first plane and the second plane, such that drops of printing fluid in the first plane are deposited to a print medium during a pass in a first direction and drops of printing fluid in the second plane are deposited to the print medium during a pass in an opposite second direction.

14. The medium of claim 13, wherein distributing the average number of drops of printing fluid into a first plane and a second plane includes distributing a total number of drops approximately equally to the first plane and the second plane.

15. The medium of claim 14, wherein generating print data includes generating data indicating whether a drop of printing fluid is deposited to the print medium during a pass in the first direction and whether a drop of printing fluid is deposited to the print medium during a pass in the second direction.

* * * * *